(12) United States Patent
Bright et al.

(10) Patent No.: US 12,481,932 B2
(45) Date of Patent: *Nov. 25, 2025

(54) SYSTEMS AND METHODS FOR IMMEDIATE MATCHING OF REQUESTOR DEVICES TO PROVIDER DEVICES

(71) Applicant: Lyft, Inc., San Francisco, CA (US)

(72) Inventors: Ido Avigdor Bright, Seattle, WA (US); Harrison Chen-Hau Chu, San Francisco, CA (US); Mayank Gulati, San Francisco, CA (US); Charles Parker Spielman, San Francsico, CA (US)

(73) Assignee: Lyft, Inc., San Francisco, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 18/314,722

(22) Filed: May 9, 2023

(65) Prior Publication Data
US 2023/0385713 A1    Nov. 30, 2023

Related U.S. Application Data

(63) Continuation of application No. 16/289,044, filed on Feb. 28, 2019, now Pat. No. 11,681,955.

(51) Int. Cl.
*G06Q 10/02*    (2012.01)
*G06Q 50/40*    (2024.01)

(52) U.S. Cl.
CPC .............. *G06Q 10/02* (2013.01); *G06Q 50/40* (2024.01)

(58) Field of Classification Search
CPC ............................... G06Q 10/02; G06Q 50/40
See application file for complete search history.

(56) References Cited

U.S. PATENT DOCUMENTS

2018/0158019 A1* 6/2018 Vutukuri ................ H04W 4/35
2019/0390971 A1* 12/2019 Shaginyan ......... G01C 21/3492

OTHER PUBLICATIONS

Ma et al. "A novel algorithm for peer-to-peer ridesharing match problem." Neural Computing and Applications, 31 (2019): 247-258 (Year: 2019).*

* cited by examiner

*Primary Examiner* — Resha Desai
*Assistant Examiner* — Patrick Kim
(74) *Attorney, Agent, or Firm* — Greenberg Traurig, LLP

(57) ABSTRACT

The disclosed computer-implemented method may include instant and optimized matching of transportation requesters with transportation providers by precomputing and caching evaluations of matching schemes between existing requests and available providers, where each of the matching schemes excludes one of the available providers. The possibility of matching any new request to a given provider may then be evaluated according to the cached results of the matching scheme that excluded that provider along with an evaluation of matching the new request to the provider, which may be a computationally easy problem. Thus, the new request may be matched to a provider instantly without waiting for the next iteration of solving the global matching problem. Matching requestors and providers in this way may also improve the accuracy of estimated time of arrival information provided to requestors. Various other methods, systems, and computer-readable media are also disclosed.

20 Claims, 12 Drawing Sheets

SYSTEMS AND METHODS FOR IMMEDIATE MATCHING OF REQUESTOR DEVICES TO PROVIDER DEVICES

CROSS REFERENCE TO RELATED APPLICATION

This application is a continuation of U.S. application Ser. No. 16/289,044, filed 28 Feb. 2019, the disclosure of which is incorporated, in its entirety, by this reference.

BACKGROUND

A dynamic transportation matching system may match transportation requestors with transportation providers, enabling transportation requestors to conveniently reach their destinations. In some cases, a dynamic transportation matching system may receive large numbers of transportation requests and have a large pool of available transportation providers. In such cases, matching requestors and providers may be a non-trivial computational problem and using an inefficient matching algorithm may consume a significant amount of computing resources. Additionally, a naïve algorithm for matching providers and requestors may not lead to the most efficient outcome for requestors or for providers. In some embodiments, in order to improve efficiency, a dynamic transportation matching system may match batches of requestors and providers at intervals.

However, in some instances, new transportation requests may arrive at any time, potentially causing delays in matching and poor user experience for transportation requestors who submit requests between matching intervals. Additionally, in some embodiments, a dynamic transportation matching system may provide estimated time of arrival (ETA) information about potential providers to potential requestors. However, including all potential requestors in the global matching problem may be computationally infeasible. Accordingly, the instant disclosure identifies and addresses a need for additional and improved systems and methods for immediately matching requestor devices to provider devices.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
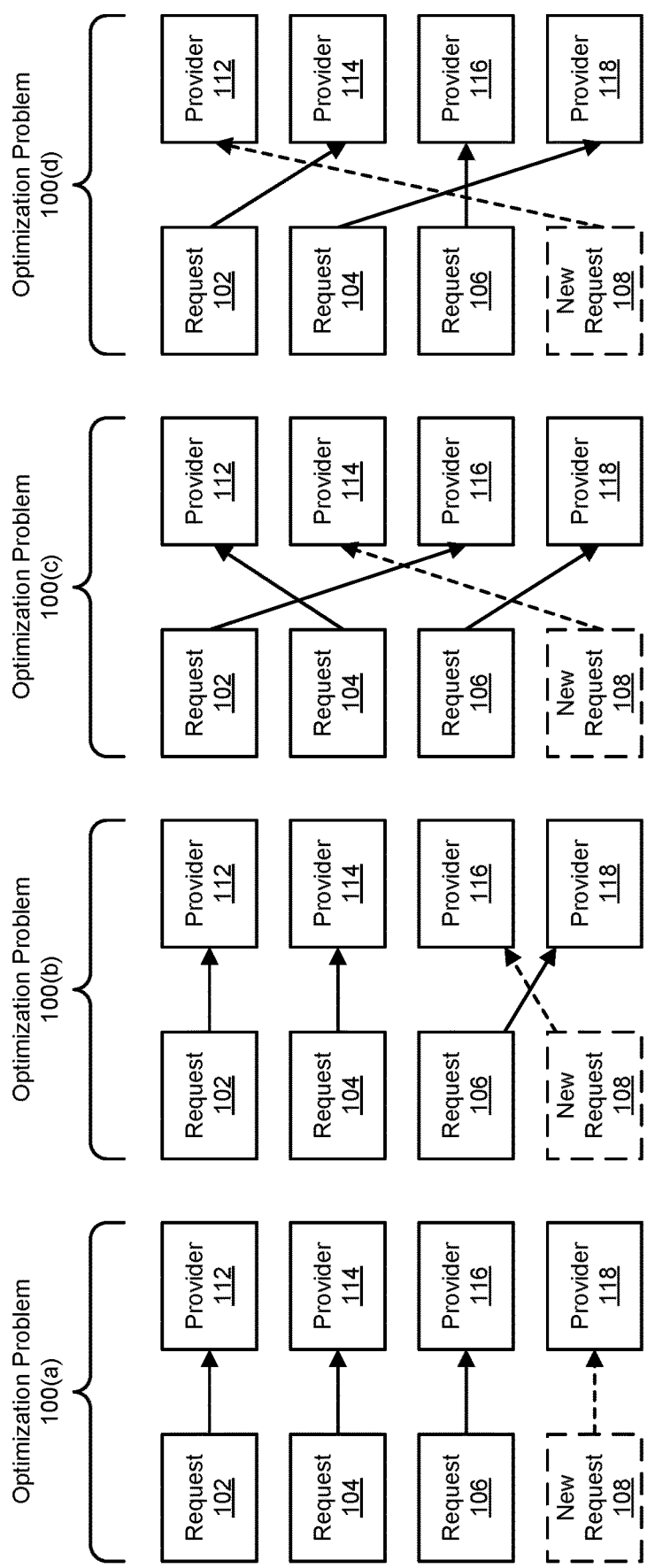
FIG. 1 is an illustration of a set of example optimization problems for matching requestor devices with provider devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for immediately matching transportation requestor devices with transportation provider devices without delaying until the next iteration of the global matching solution. In some embodiments, requestors may be matched with providers instantly by using a naïve, greedy algorithm (e.g., matching a requestor with the closest available provider). However, this may preclude swapping providers and lead to suboptimal results. More complex matching algorithms may be computationally hard problems—a cost that may be compounded by recomputing the optimal matching each time a new request is received (or a new session is opened). Instant and/or optimized matching for new requests may be achieved by precomputing and caching evaluations of matching schemes between existing requests and available providers, where each of the matching schemes excludes one of the available providers (e.g., by excluding the provider from consideration, matching the provider with a dummy requestor, artificially lowering the capacity of the provider, and/or other methods). The possibility of matching any new request to a given provider may then be evaluated according to the cached results of the matching scheme that excluded that provider along with an evaluation of matching the new request to the provider, which may be a computationally easy problem. Thus, the new request may be matched to a provider instantly without waiting to include the new request in the next global matching problem. In particular, a linear program (e.g., that includes a perturbation term) may identify an optimal matching scheme between requestors and providers and may, without significant additional computational cost, produce information (that can be cached) regarding alternate matching schemes, each excluding one of the providers. In addition, where the linear program optimizes for ETA, instant and accurate ETA information may be provided to requestors with no significant additional computational cost, thereby significantly improving requestor experience and conversions from transportation requests into completed trips (e.g., by reducing cancellations due to inaccurate ETA).

Accordingly, as may be appreciated, the systems and methods described herein may improve the functioning of a computer that matches transportation requestor devices with transportation provider devices as part of a dynamic transportation matching system. In addition, these systems and methods may improve the functioning and efficiency of a dynamic transportation network by improving transportation matches (e.g., according to ETA metrics and/or other metrics) relative to computational cost. Furthermore, for the reasons mentioned above and to be discussed in greater detail below, the systems and methods described herein may provide advantages to the field of dynamic transportation matching by improving the efficiency of matching, improving the accuracy of ETAs, and/or improving transportation requestor experience.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include road-going vehicles (e.g., cars, light trucks, etc.). Furthermore, the dynamic transportation network may include personal mobility vehicles. In some embodiments, a dynamic transportation network may include autonomous vehicles (e.g., self-driving cars) that may be capable of operating with little or no input from a human operator.

FIG. 1 illustrates a set of example optimization problems for matching requestor devices with provider devices. As illustrated in FIG. 1, matching a new request 108 to a provider in the presence of existing requestor-provider matches may be an optimization problem with several permutations, each created by matching the new request with a different provider and then determining whether and/or how to change the previous matches based on the new match. For example, an optimization problem 100(a) may match a request 102 to a provider 112, a request 104 to a provider 114, a request 106 to a provider 116, and/or new request 108 to provider 118. However, matching new request 108 to provider 118 may not result in the optimal matching solution for all requestors and/or providers. Optimization problems 100(b), 100(c), and/or 100(d), which match new request 108 with providers 116, 114, and 112, respectively, may give different results, at least one of which may be superior to the result of optimization problem 100(a). Because each optimization problem may need to be solved to determine which matching scenario for the new request produces the overall optimal solution, matching new requestors and providers via solving a set of optimization problems may consume significant computational resources.

Figure 2:
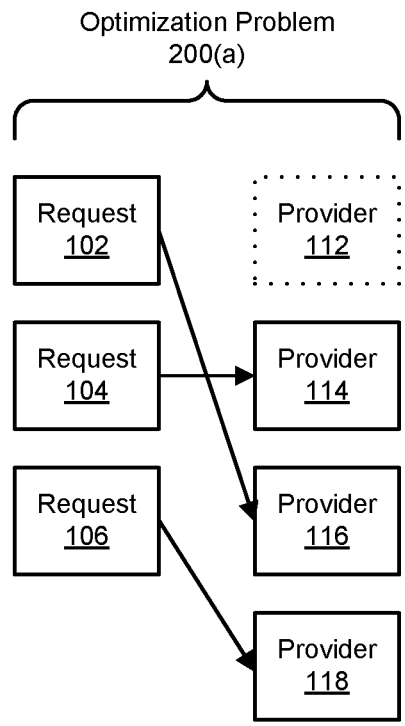
FIG. 2 is an illustration of a set of example optimization problems for matching requestor devices with provider devices.
Figure 2:
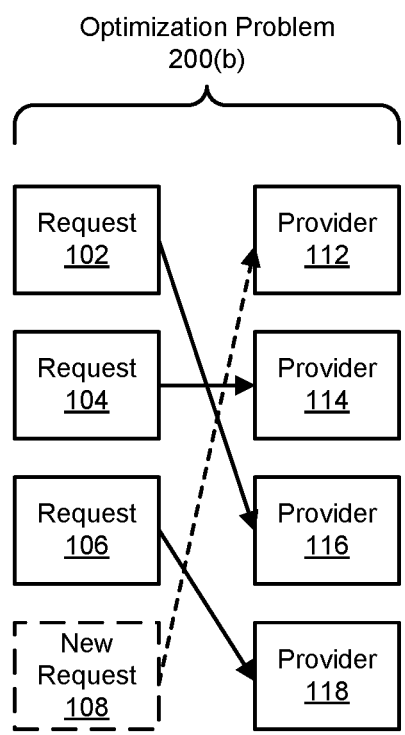

FIG. 2 illustrates a set of example optimization problems for matching requestor devices with provider devices. As illustration in FIG. 2, an optimization problem 200(a) may match requests 102, 104, and/or 106 while omitting provider 112. In some embodiments, optimization problem 200(a) may represent a linear program that produces a set of matching solutions that each omit a different available transportation provider. In one example, if new request 108 is matched with provider 112, then solving an optimization problem 200(b) may be computationally trivial because all of the optimal matches for requestors and providers in the absence of provider 112 were already calculated when solving optimization problem 200(a). Similarly, solving other permutations of the optimization problem that match new request 108 with different providers may also be computationally trivial due to the pre-existing solutions generated by previously solving the optimization problem while omitting each of those providers.

Figure 3:
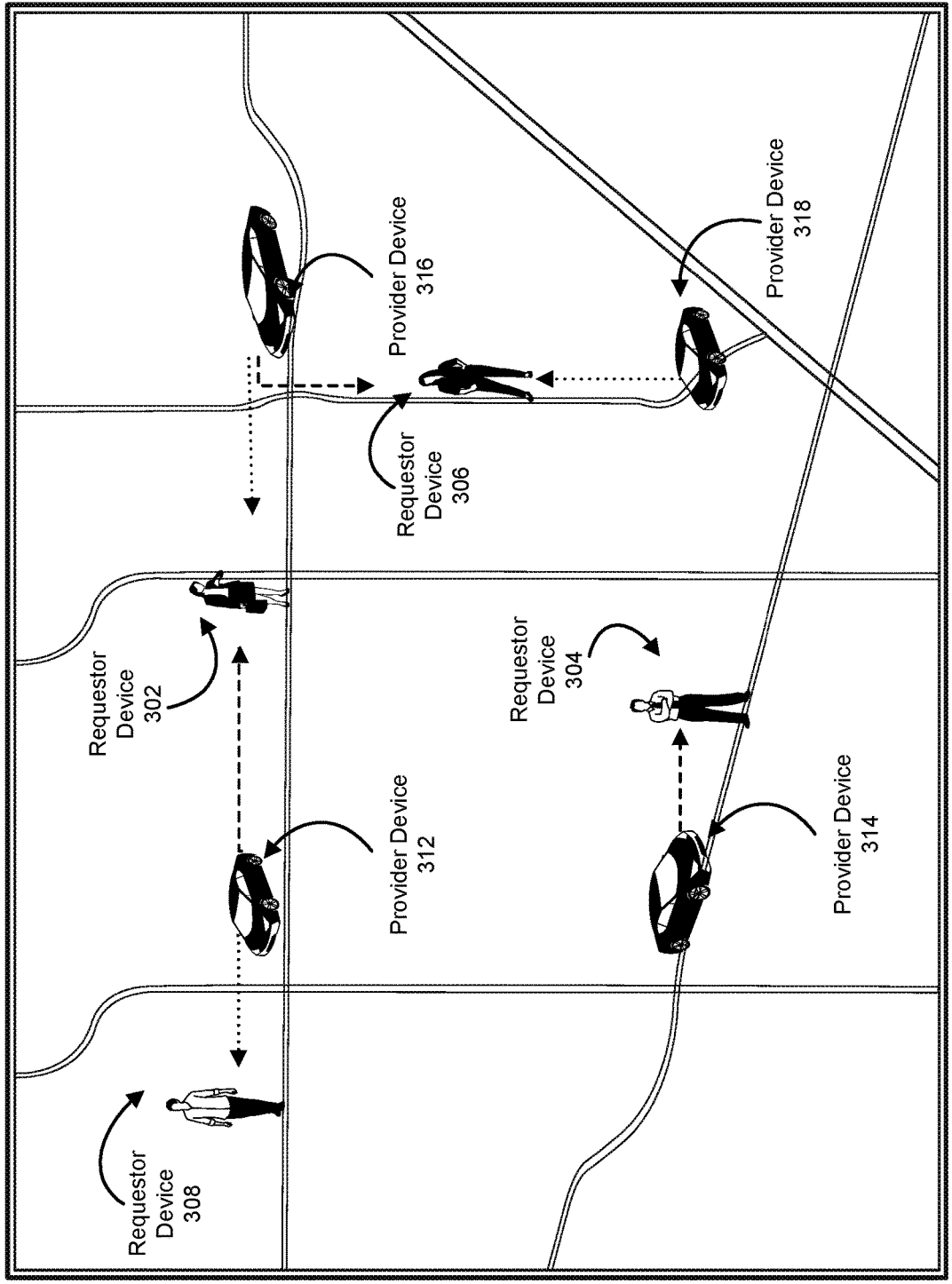
FIG. 3 is an illustration of a set of example transportation requestors and providers.

FIG. 3 illustrates a set of example transportation requestors and providers. In some circumstances, it may be advantageous to swap a transportation provider to a new transportation requestor device and match a different transportation provider with the requestor device that the swapped provider was previously matched with, in some instances causing a chain reaction of swapping. For example, as illustrated in FIG. 3, a requestor device 302 may be matched with a provider device 312, a requestor device 304 with a provider device 314, and/or a requestor device 306 with a provider device 316. In one example, a dynamic transportation matching system may receive a new transportation request from a requestor device 308. In some examples, provider device 312 may be the closest available provider to requestor device 308. The term "available provider" or "available provider device," as used herein, generally refers to any transportation provider that is not at full capacity. In some examples, an available provider may not be matched with a requestor. Additionally or alternatively, an available provider may be matched with a requestor but may not yet have met the requestor. In some examples, an available provider may be transporting a requestor as part of a shared transportation option and may have available capacity for one or more additional requestors.

In one example, the dynamic transportation matching system may match requestor device 308 with provider device 312, negating the match between requestor device 302 and provider device 312. The dynamic transportation matching system may then match requestor device 302 with provider device 316 and requestor device 306 with provider device 318. By matching the various requestor and provider devices as described, the dynamic transportation matching system may provide a suitable match (e.g., significantly closer than provider device 318) for requestor device 308 without introducing significant delay for other requestors and providers.

Figure 4:
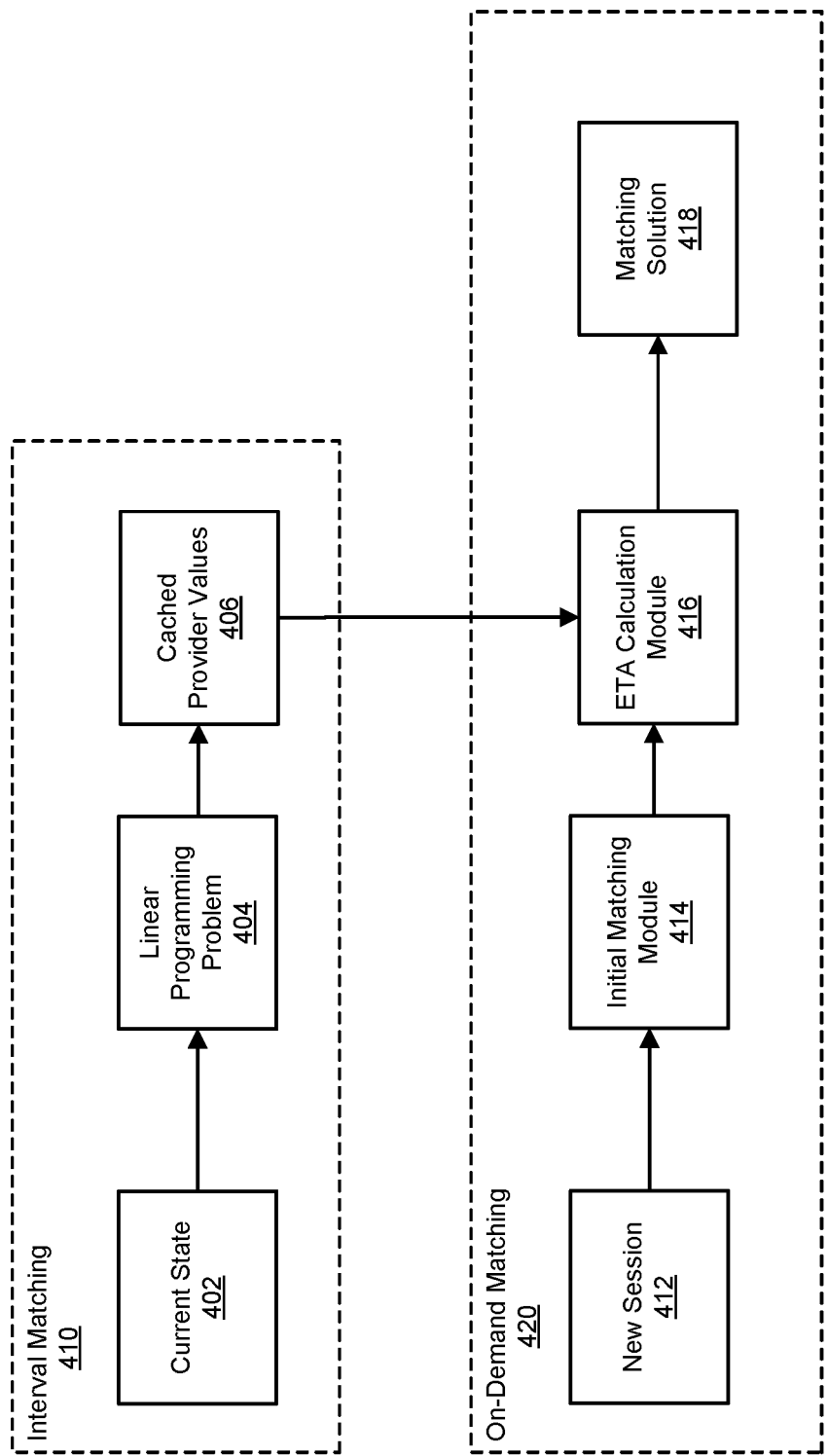
FIG. 4 is a block diagram of an example system for immediate matching of requestor devices to provider devices.

FIG. 4 is a block diagram of an example system for immediate matching of requestor devices to provider devices. In some embodiments, a dynamic transportation matching system may solve a global matching problem at intervals and may provide immediate on-demand matching for requests received between intervals. For example, as illustrated in FIG. 4, interval matching 410 may include determining a current state 402 of available transportation providers and received transportation requests and solving a linear programming problem 404 to match available provider devices to requestor devices. In some embodiments, solving linear programming problem 404 may produce provider availability values that can be stored as cached provider values 406. The term "provider availability value" or "provider value," as used herein, may refer to any numeric representation of the value to the dynamic transportation network of keeping the provider available for matching rather than matching the provider device associated with the provider with a transportation requestor device. In some examples, a provider value may include and/or be based at least in part on the overall ETA impact on the dynamic transportation network. For example, if matching a requestor device with the given provider device rather than another provider device would result in an ETA of five minutes rather than ten minutes for that requestor device, the overall ETA impact and/or provider value may be five minutes. If removing the provider from the dynamic transportation network would cause a chain reaction that delays multiple trips each by a minute or two for a total of ten minutes of delay across the dynamic transportation network, the overall ETA impact and/or provider value may be ten minutes. Additionally or alternatively, provider value may include other characteristics of a provider. For example, if a provider has an accessible vehicle that can accommodate disabled transportation requestors, the value of keeping that provider available may be higher than the value of keeping a similar but non-accessible provider available.

In some examples, by caching provider availability values, the systems described herein may determine the impact on the dynamic transportation network of matching a provider device with a new transportation request in a computationally trivial way. For example, if two provider devices are similarly good matches for a requestor device and one provider device has an availability value of ten minutes and the other provider device has an availability value of five minutes, matching the latter provider device with the requestor device may be more optimal for the dynamic transportation network. By using the cached values, the dynamic transportation network may not have to recalculate any other matches. For example, to perform on-demand matching 420, the dynamic transportation matching system may detect that a requestor device has initiated a new session 412 that may convert into a transportation request. In some examples, new session 412 may represent a user opening an application that facilitates transportation via the dynamic transportation network. In some examples, new session 412 may represent a user providing a starting location (e.g., manually and/or via location services on the requestor device) and/or a destination for a trip and/or requesting information on completing the trip. In one embodiment, an initial matching module 414 may tentatively match the requestor device with at least one transportation provider. In some examples, an ETA calculation module 416 may use cached provider values 406 to calculate which of the tentatively matched transportation providers will have the optimal impact on the dynamic transportation network if matched with the requestor device (rather than staying matched to a previously-matched requestor device or remaining idle). In some examples, a matching solution 418 may include a list of one or more transportation providers that will be immediately matched to the requestor device should the requestor device send a transportation request. In some embodiments, the systems described herein may store the second-best provider match (by provider value) for a given requestor and/or the second-best requestor match for a given provider.

Figure 5:
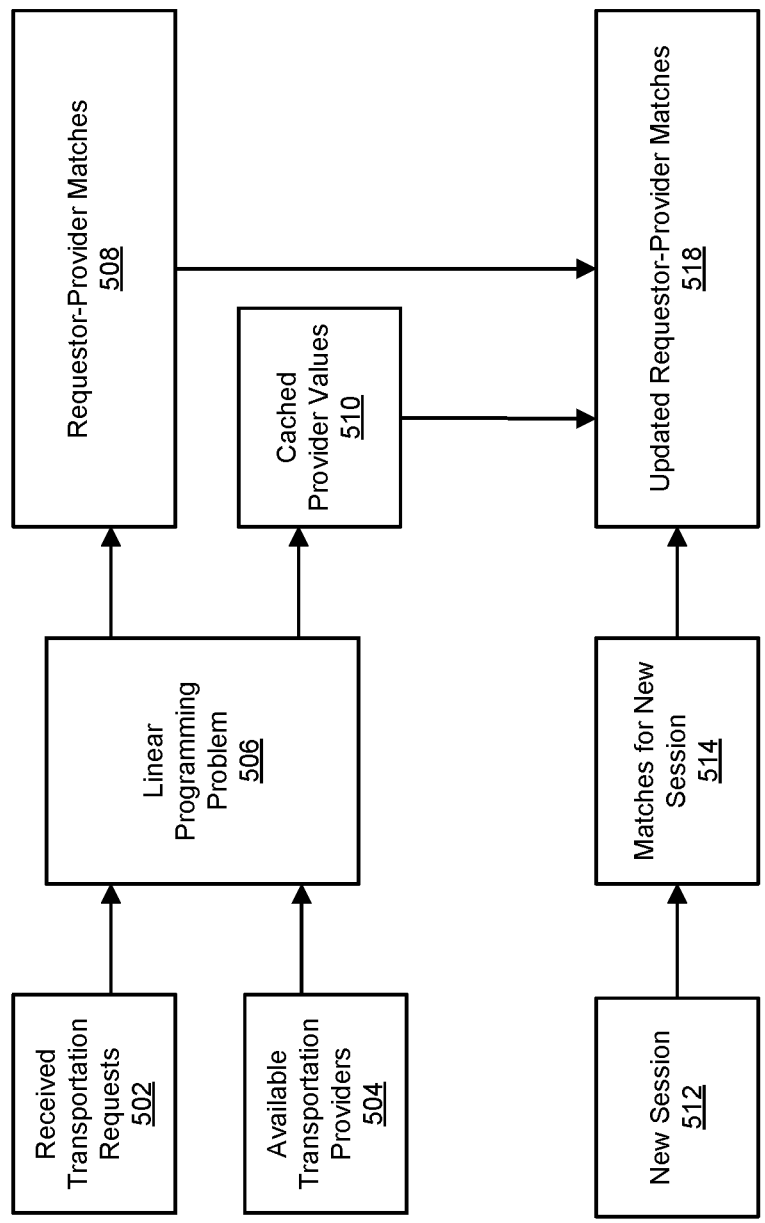
FIG. 5 is a block diagram of an example system for immediate matching of requestor devices to provider devices.

FIG. 5 is a block diagram of an example system for immediate matching of requestor devices to provider devices. In one embodiment, a linear programming problem 506 may receive as inputs the current states of received transportation requests 502 and/or available transportation providers 504. In some embodiments, linear programming problem 506 may be set to minimize ETA across the dynamic transportation network. Additionally or alternatively, linear programming problem 506 may be set to maximize the efficiency of the use of provider capacity (e.g., seats in cars). In some embodiments, linear programming problem 506 may include a bipartite matching problem (e.g., matching received transportation requests with available drivers). In some embodiments, linear programming problem 506 may include one or more constraints on various terms, including transportation requests and transportation providers. For example, linear programming problem 506 may include a perturbation term that acts as a constraint on transportation provider capacity. In some embodiments, including a perturbation term that acts as a constraint on provider capacity may cause linear programming problem 506 to produce an availability value for each available transportation provider. For example, linear programming problem 506 may produce cached provider values 510 in addition to requestor-provider matches 508.

In one embodiment, linear programming problem 506 may include some or all of the following constraints:

$$\min \sum_{i=0}^{N} \sum_{j=0}^{M} x_{i,j} c_{i,j}$$

$$\text{s.t. } \forall j \leq M \sum_{i=0}^{N} x_{i,j} = 1$$

$$\forall i \leq N \sum_{j=0}^{M} x_{i,j} = 1 - \epsilon$$

$$x_{i,j} \geq 0$$

$$\epsilon = \frac{1}{2N}$$

$$\forall j \leq M c_{0,j} = \Gamma \gg 1$$

Where N represents the number of transportation providers, M represents the number of transportation requestors, the first constraint specifies minimizing the aggregate cost of matches between providers and requestors, the second constraint represents transportation requestor constraints, the third constraint represents transportation provider constraints, E is a perturbation term, i=0 and/or j=0 represent extra unfilled edges (e.g., in a theoretical provider-requestor graph) per requestor, and $c_{i,j}$ represents the cost (e.g., in terms of ETA and/or any other constraint being optimized for) for matching a provider i and a requestor j such that $x_{i,j}=1$ when there is a match between provider i and requestor j. In some embodiments, to exclude already-assigned providers from matching, the constant $\Gamma$ may be set to a high value such as a multiple of the maximum value of $c_{i,j}$ and/or requestor-provider pairs with a value of $c_{i,j}$ above a certain threshold (such as $\Gamma/2$) may be excluded from consideration.

In some embodiments, linear programming problem 506 may produce a ranked list of provider matches for each transportation requestor device. For example, requestor-provider matches 508 may include a matched provider device and a backup provider device for each requestor device. In another example, requestor-provider matches 508 may include a ranked list of four provider devices for each requestor device. By including one or more backup provider devices in the matching scheme, the systems described herein may facilitate swapping between existing requestor devices and new requestor devices. For example, if the matched provider device of a requestor device is swapped to a different requestor device, the requestor device may automatically match with the next-highest-ranked provider device, avoiding another computationally costly round of matching.

In some examples, the dynamic transportation matching system may detect a new session 512. In some embodiments, the dynamic transportation matching system may produce one or more matches for the new session 514 via any suitable matching algorithm. If new session 512 converts into a transportation request, the dynamic transportation matching system may use cached provider values 510 and requestor-provider matches 508 to produce updated requestor-provider matches 518 that includes a match between the new requestor device and a provider device. In some examples, if new session 512 does not convert into a transportation request, the systems described herein may produce one or more potential matches for the transportation requestor device but may not modify any existing matches. In some embodiments, new sessions may each be matched independently of one another. Because not every new session may convert into a transportation request within the window before the next global matching iteration, in some examples, multiple new sessions may result in several different requestor devices each associated with a new session matching with the same transportation provider device.

Figure 6:
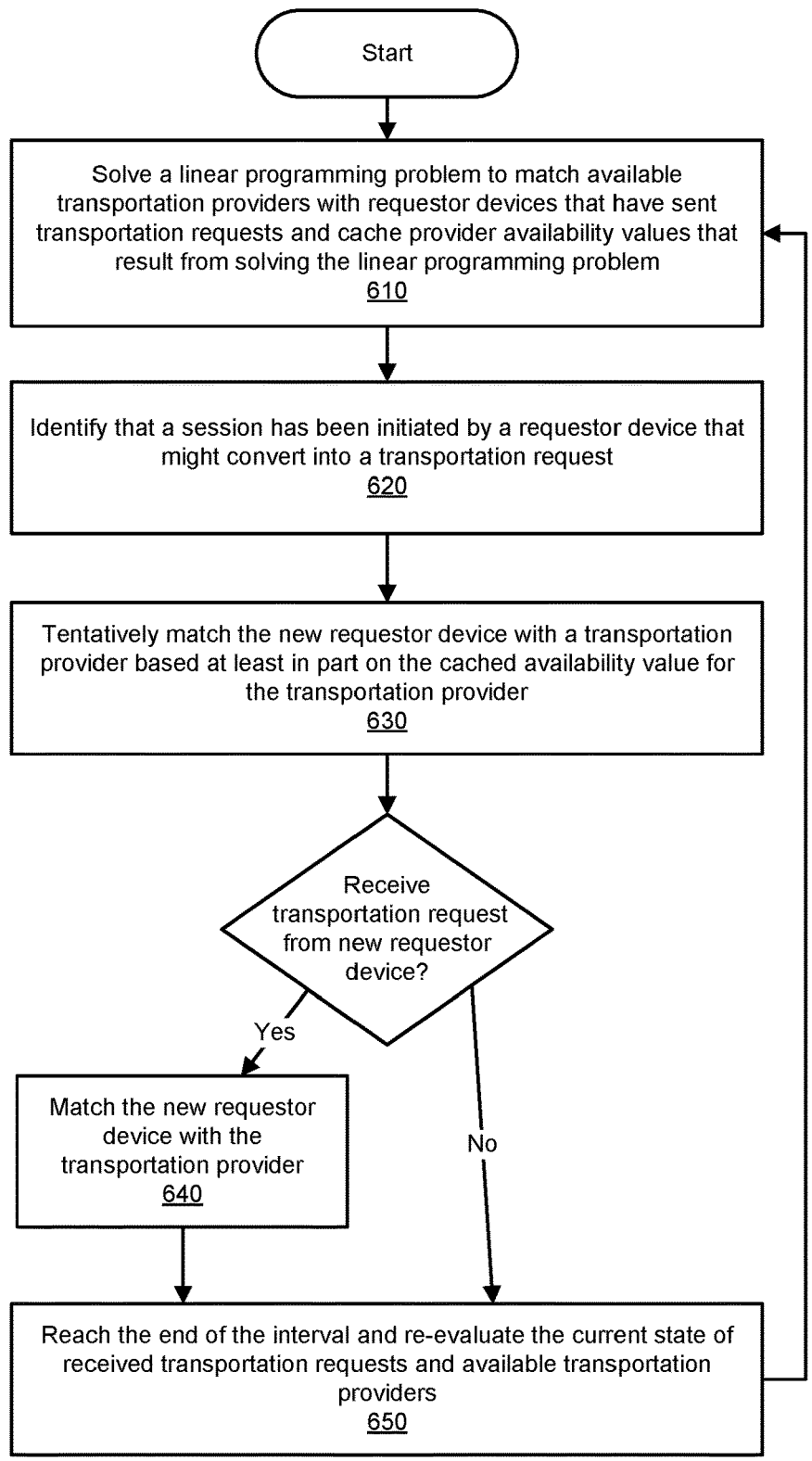
FIG. 6 is a flow diagram of an example method for immediate matching of requestor devices to provider devices.

FIG. 6 is a flow diagram of an example method 600 for immediate matching of requestor devices to provider devices. In some examples, at step 610, the systems described herein may solve a linear programming problem to match available transportation providers with requestor devices that have sent transportation requests and cache provider availability values that result from solving the linear programming problem. In some embodiments, the systems described herein may perform step 610 at intervals, such as every ten milliseconds, every second, every two seconds, every five seconds, or every ten seconds. At step 620, the systems described herein may identify that a session has been initiated by a requestor device that might convert into a transportation request. For example, the systems described herein may identify that a requestor device has opened a dynamic transportation application and/or entered destination information into a dynamic transportation application. At step 630, the systems described herein may tentatively match the new requestor device with a transportation provider based at least in part on the cached availability value for the transportation provider. For example, the systems described herein may match the new requestor device with a transportation provider device based in part on the provider associated with the provider device having an availability value that indicates a low ETA impact on the dynamic transportation network.

If the systems described herein receive a transportation request from the new requestor device, at step 640, the systems described herein may match the new requestor device with the transportation provider tentatively matched in step 630, occupying capacity of that transportation provider (e.g., removing the transportation provider from the pool of available transportation providers for a private trip or reducing the capacity of the transportation provider for a shared trip). If the systems described herein do not receive a transportation request from the new requestor device, the systems described herein may not update the matched provider to reflect a decreased capacity because there is no guarantee that the new requestor device will make a transportation request. At step 650, the systems described herein may reach the end of the interval and re-evaluate the current state of received transportation requests and available transportation providers, returning to step 610 to solve the linear programming problem that generates a global matching solution for available providers and received transportation requests.

Figure 7:
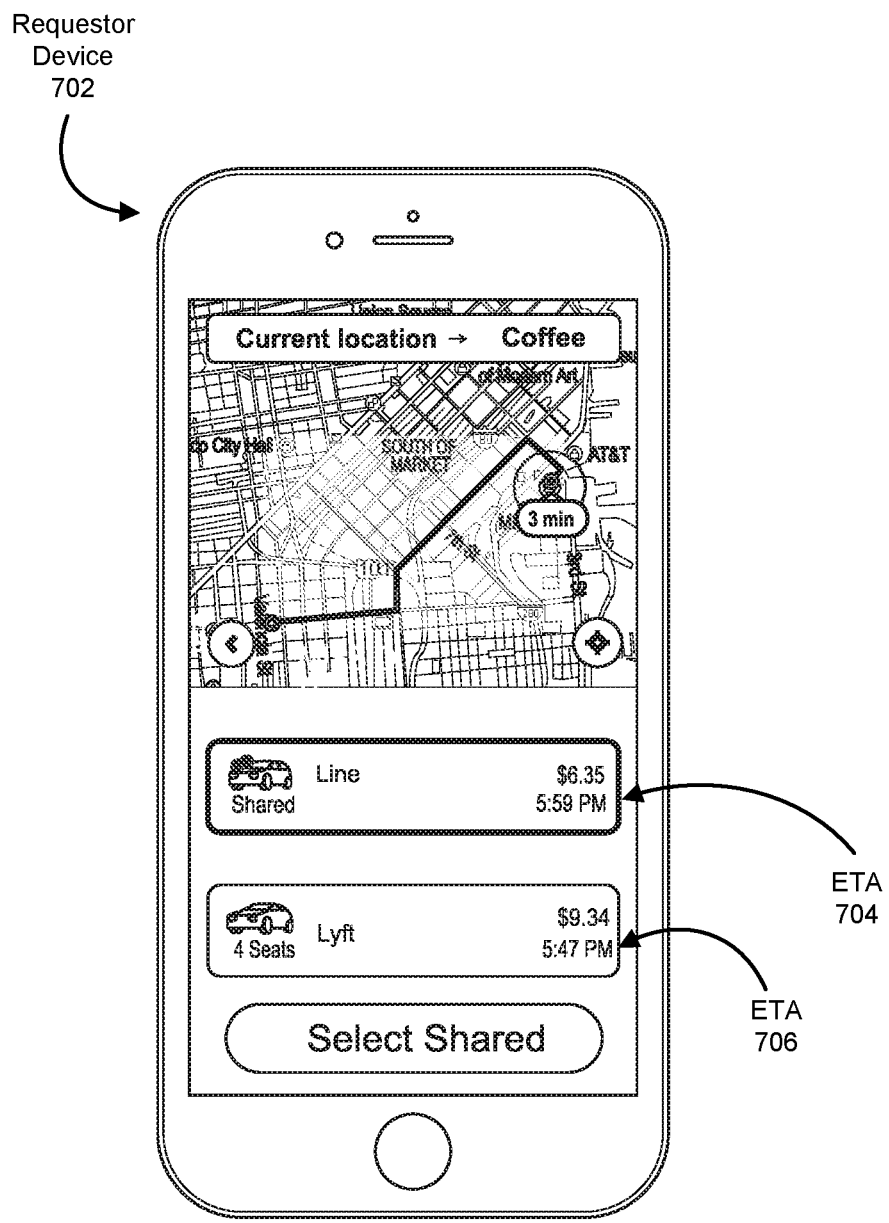
FIG. 7 is an illustration of an example transportation requestor device.

FIG. 7 illustrates an example transportation requestor device displaying an ETA for a provider. In some embodiments, the systems described herein may use the tentative matching of new sessions to provide requestor devices with ETAs. For example, if the systems described herein tentatively match a requestor device that has launched a new session with a provider that is five minutes away, the systems described herein may provide an ETA of five minutes. In some examples, the systems described herein may display ETAs for multiple providers and/or trip types. For example, a requestor device 702 may initiate a new session and the systems described herein may provide requestor device 702 with an ETA 704 for a shared mode of transportation via one provider and an ETA 706 for a private mode of transportation via a different provider. In some embodiments, the systems described herein may improve the accuracy of ETAs by generating an ETA based on a tentatively matched provider device and then, upon receiving a transportation request, instantly matching the requestor device with the tentatively matched provider device, ensuring that the previously provided ETA is relevant. The term "instant" or "instantly," as used herein, generally refers to any computation and/or action that can be performed without solving a linear programming problem and/or graph. For example, a transportation requestor may be instantly matched to a transportation provider if the transportation requestor is matched to the transportation provider using cached values without waiting for the next iteration of the global linear problem. Because inaccurate ETAs may cause inconvenience for transportation requestors and/or cause transportation requestors to cancel trips, improving the accuracy of ETAs may lead to an improved transportation requestor experience and/or improved efficiency of the dynamic transportation matching system.

Figure 8:
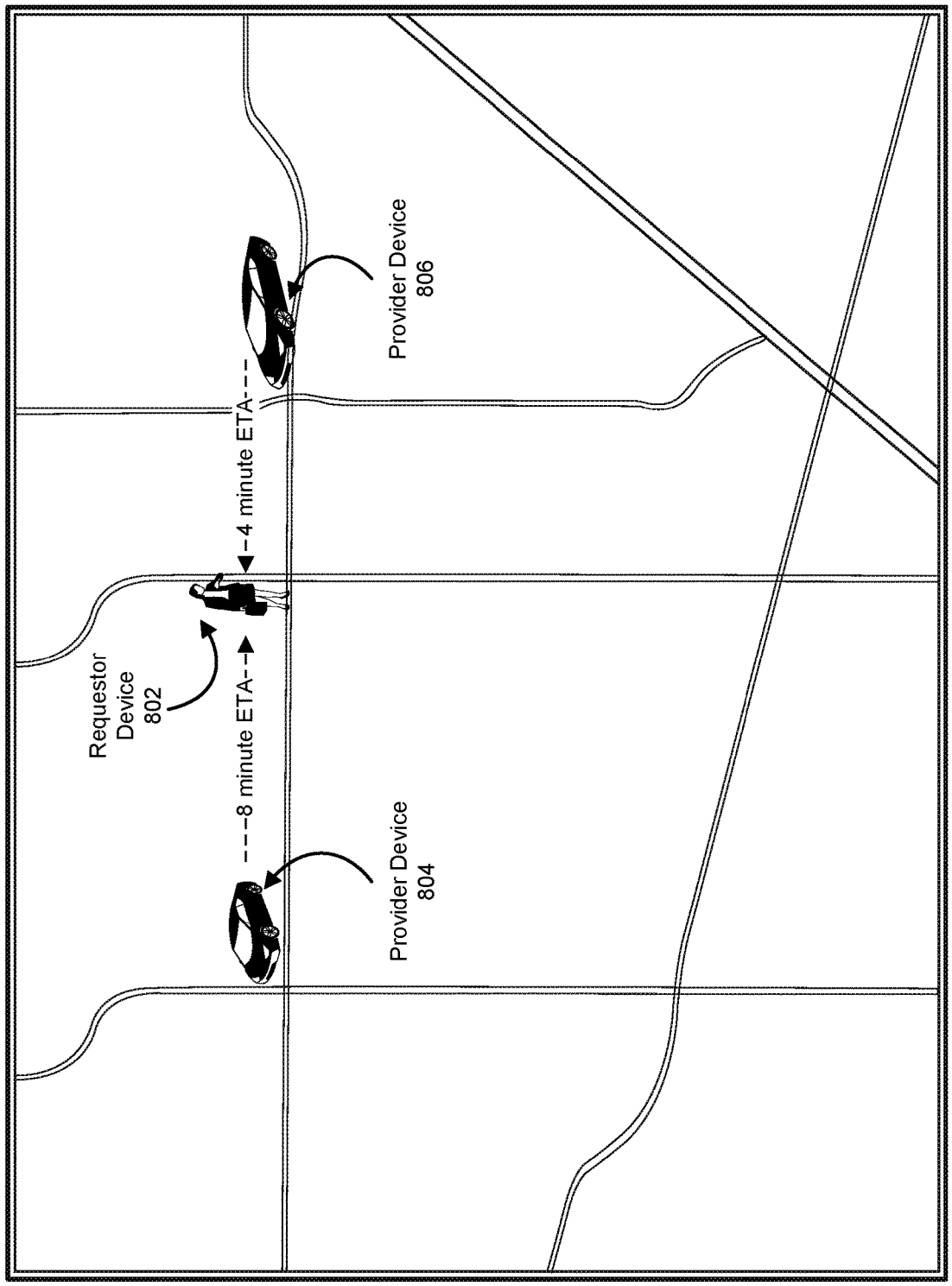
FIG. 8 is an illustration of an example potential transportation requestor and potential providers.

FIG. 8 illustrates an example potential transportation requestor and potential providers. In some examples, the systems described herein may tentatively match a potential transportation requestor device (e.g., a requestor device that has initiated a session but not sent a transportation request) with more than one potential provider device. For example, the systems described herein may tentatively match the requestor device with a first provider device and a backup provider device in case the first provider device is unavailable (e.g., due to being matched with a different requestor, changes in traffic that make the first provider device no longer optimal, the first provider device going offline, and/or other reasons). In some examples, the systems described herein may provide a blended ETA when a potential requestor device is tentatively matched with multiple potential provider devices. In one example, as illustrated in FIG. 8, a requestor device 802 may be eight minutes away from a provider device 804 and/or four minutes away from a provider device 806. The systems described herein may produce a blended ETA in a variety of ways. In one embodiment, the systems described herein may average the ETAs and may provide requestor device 802 with an ETA of six minutes. Additionally or alternatively, the systems described herein may weight each potential provider device and blend ETAs accordingly. For example, if the systems described herein predict a 75% chance of a match with provider device 806 and a 25% chance of a match with provider device 804, the systems described herein may provide requestor device 802 with an ETA of five minutes. By providing a blended ETA, the systems described herein may reduce the maximum ETA error. For example, if the systems described herein provide an ETA of four minutes and then match requestor device 802 with provider device 804, the initial ETA may be late by four minutes and the transportation requestor may be inconvenienced and/or cancel the transportation request. Similarly, if the systems described herein provide an ETA of eight minutes and then match requestor device 802 with provider device 806, the initial ETA may be early by four minutes and the transportation provider may also be inconvenienced and/or cancel (e.g., due to not being prepared to leave). However, if the systems described herein provide requestor device 802 with an ETA of six minutes, the ETA may only be inaccurate by two minutes no matter which of the two provider devices is matched with requestor device 802.

Figure 9:
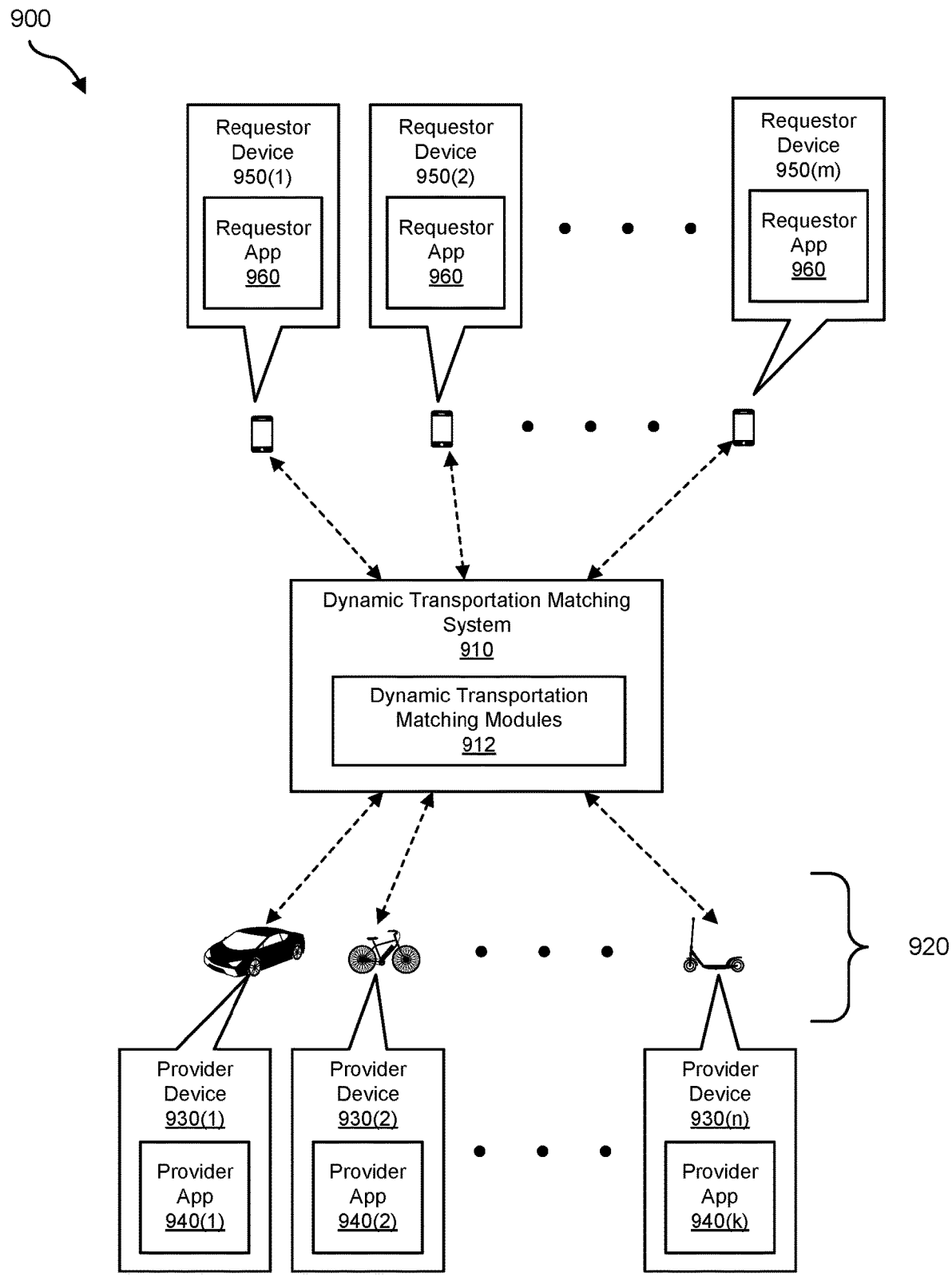
FIG. 9 is a block diagram of an example system for immediate matching of requestor devices to provider devices.

FIG. 9 illustrates an example system 900 for matching transportation requests with a dynamic transportation network that includes personal mobility vehicles. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include road-going vehicles and personal mobility vehicles. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 9 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include provider devices 930(1)-(*n*) (e.g., whether integrated into the vehicle, permanently affixed to the vehicle, temporarily affixed to the vehicle, worn by a driver of the vehicle, etc.). In some examples, provider devices 930 may include a provider apps 940(1)-(*k*). Provider apps 940(1)-(*k*) may represent any application, program, and/or module that may provide one or more services related to operating a vehicle and/or providing transportation matching services. For example, provider apps 940(1)-(*k*) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 940(1)-(*k*) may match the user of provider apps 940(1)-(*k*) (e.g., a transportation provider) with transportation requestors through communication with dynamic transportation matching system 910. In addition, and as is described in greater detail below, provider apps 940(1)-(*k*) may provide dynamic transportation management system 910 with information about a provider (including, e.g., the current location of the provider and/or vehicle) to enable dynamic transportation management system 910 to provide dynamic transportation matching and/or management services for the provider and one or more requestors. In some examples, provider apps 940(1)-(*k*) may coordinate communications and/or a payment between a requestor and a provider. According to some embodiments, provider apps 940(1)-(*k*) may provide a map service, a navigation service, a traffic notification service, and/or a geolocation service.

Additionally, as shown in FIG. 9, dynamic transportation matching system 910 may communicate with requestor devices 950(1)-(*m*). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 10:
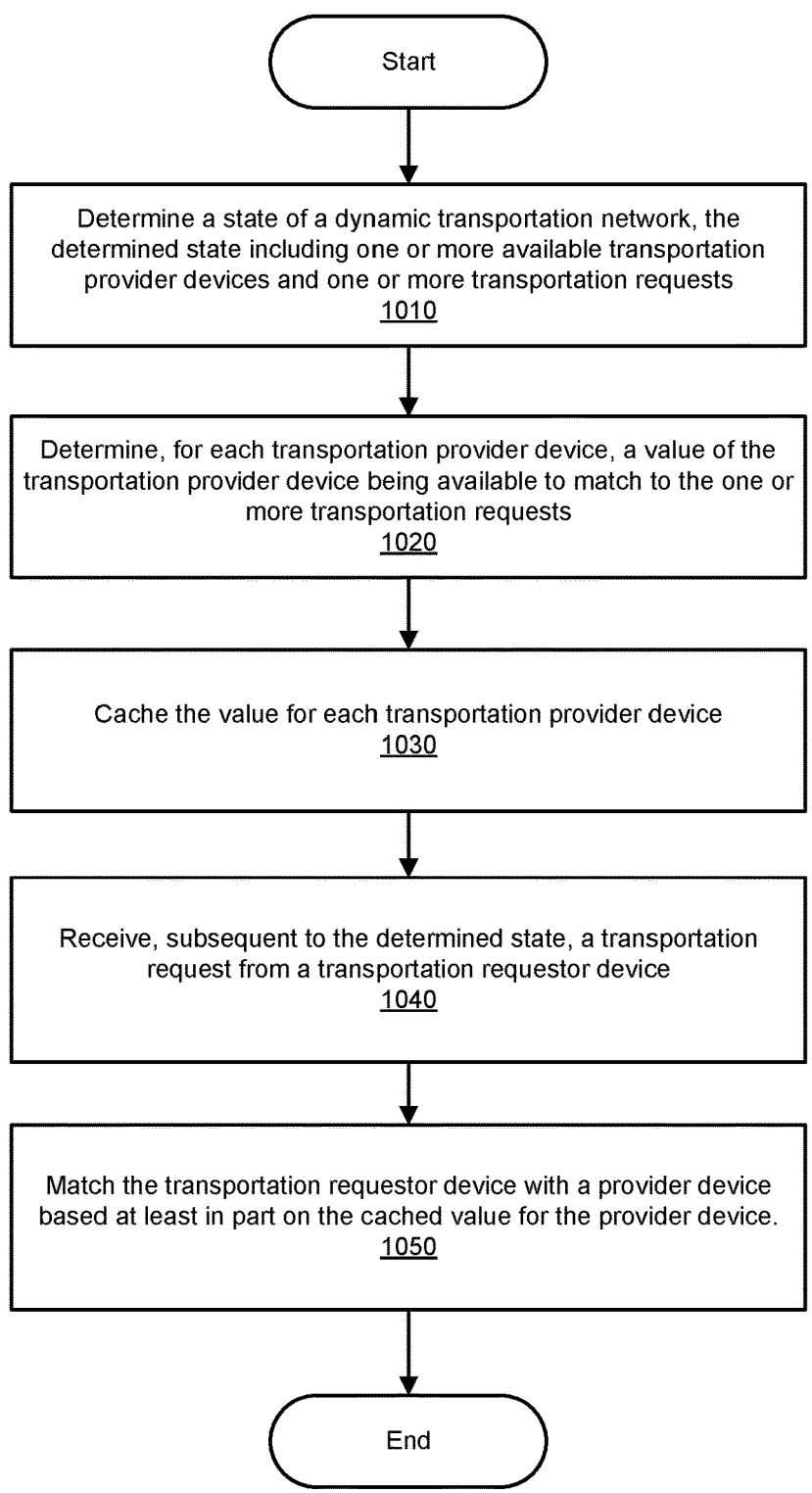
FIG. 10 is a flow diagram of an example method for immediate matching of requestor devices to provider devices.

FIG. 10 illustrates an example method 1000 for matching transportation requestors and providers. As illustrated in FIG. 10, at step 1010, one or more of the systems described herein determine a state of a dynamic transportation network, the determined state including one or more available transportation provider devices and one or more transportation requests.

In some examples, determining the state of the dynamic transportation network may include periodically determining a new state of the dynamic transportation network at a start of a predetermined interval. In one example, receiving, subsequent to the determined state, the transportation request from the transportation requestor device may include receiving the transportation request after the start of the predetermined interval and matching the transportation requestor device with the provider device based at least in part on the cached value for the provider device may include matching the transportation requestor device with the provider device prior to determining the new state of the dynamic transportation network.

At step 1020, one or more of the systems described herein may determine, for each transportation provider device, a value of the transportation provider device being available to match to the one or more transportation requests.

In some examples, determining, for each transportation provider device, the value of the transportation provider device being available to match to the one or more transportation requests may include determining a cumulative ETA increase for the one or more transportation provider devices resulting from not matching the transportation provider device with any of the one or more transportation requests. Additionally or alternatively, determining, for each transportation provider device, the value of the transportation provider device being available to match to the one or more transportation requests may include solving a linear program that optimizes matches between the one or more transportation requests and the one or more available transportation providers and receiving the value as an output of solving the linear program. In some embodiments, solving the linear program may include optimizing for a minimum aggregate ETA for the one or more available transportation providers to one or more transportation requestor devices associated with the one or more transportation requests. In some examples, solving the linear program may include solving a linear program that includes a perturbation term within a constraint on transportation provider capacity.

At step 1030, one or more of the systems described herein may cache the value for each transportation provider device.

At step 1040, one or more of the systems described herein may receive, subsequent to the determined state, a transportation request from a transportation requestor device.

In some examples, receiving, subsequent to the determined state, the transportation request from the transportation requestor device may include detecting that the transportation requestor device has initiated a session with a dynamic transportation matching application, where initiating the session includes sending a request for information about available transportation.

At step 1050, one or more of the systems described herein may match the transportation requestor device with a provider device based at least in part on the cached value for the provider device.

In one example, matching the transportation requestor device with the provider device based at least in part on the cached value for the provider device may include providing an ETA of the transportation provider device to the transportation requestor device. In some embodiments, providing the ETA of the transportation provider device may include identifying a set of candidate transportation provider devices based at least in part calculating on an estimated time of arrival for each candidate transportation provider device and selecting the transportation provider device based at least in part on the ETA of the transportation provider device.

In one embodiment, matching the transportation requestor device with the provider device may include matching a currently matched provider device that was matched with a different transportation requestor device with the transportation requestor device based at least in part on the cached value for the provider device indicating a shorter estimated arrival time for the transportation requestor device and matching a different provider device with the different transportation requestor device based at least in part on the cached value for the different provider device. In some examples, matching the transportation requestor device with the provider device may include matching a primary provider device and at least one backup provider device with the transportation requestor device. In some examples, the systems described herein may also provide the transportation requestor device with an ETA that is calculated based on both an ETA of the primary provider device and an ETA of the at least one backup provider device.

Figure 11:
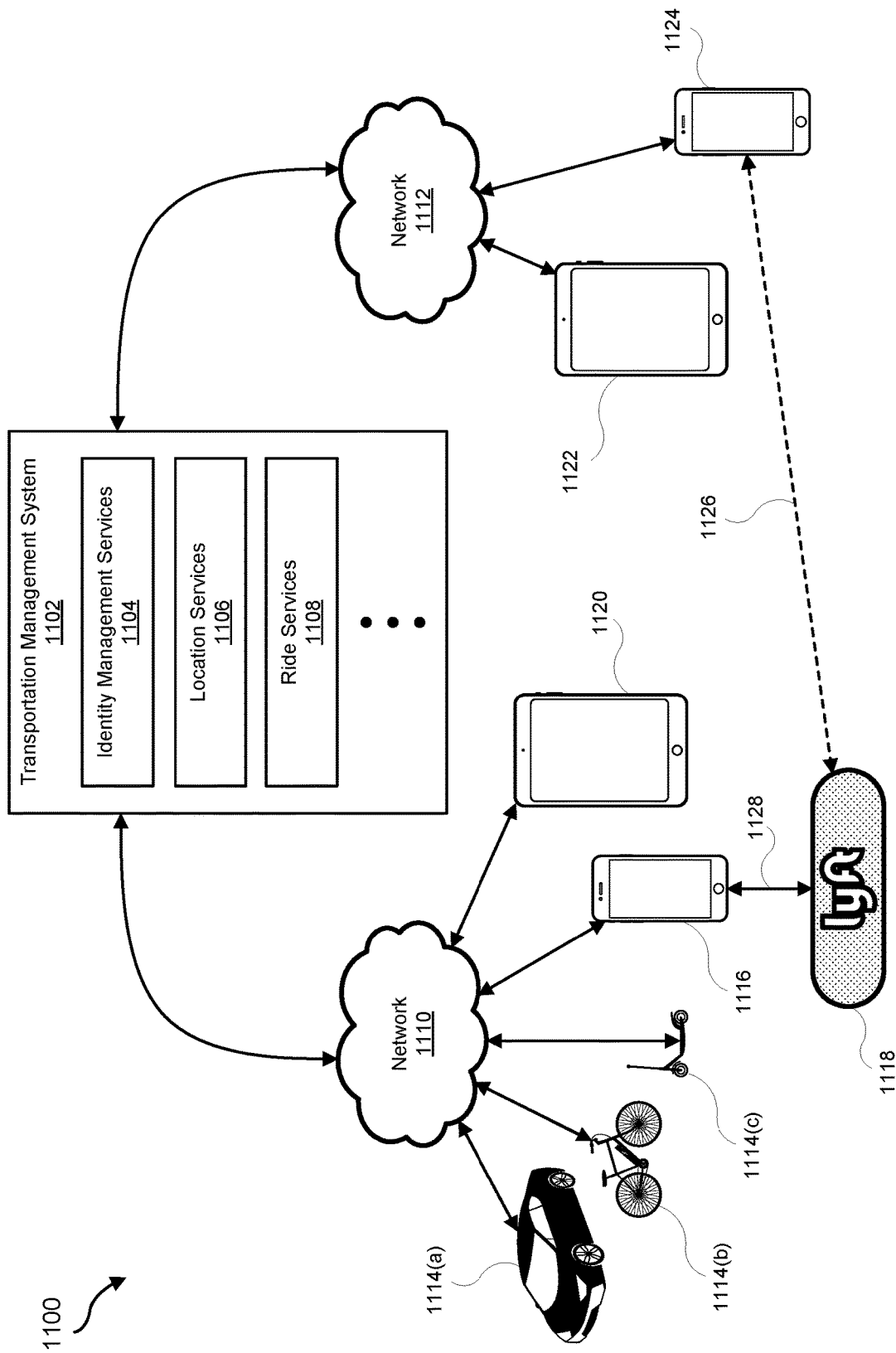
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(a), 1114(b), and/or 1114(c); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information.

Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services module 1104 has authenticated the identity a ride requestor, ride services module 1108 may attempt to match the requestor with one or more ride providers. In some embodiments, ride services module 1108 may identify an appropriate provider using location data obtained from location services module 1106. Ride services module 1108 may use the location data to identify providers who are geographically close to the requestor (e.g., within a certain threshold distance or travel time) and/or who are otherwise a good match with the requestor. Ride services module 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
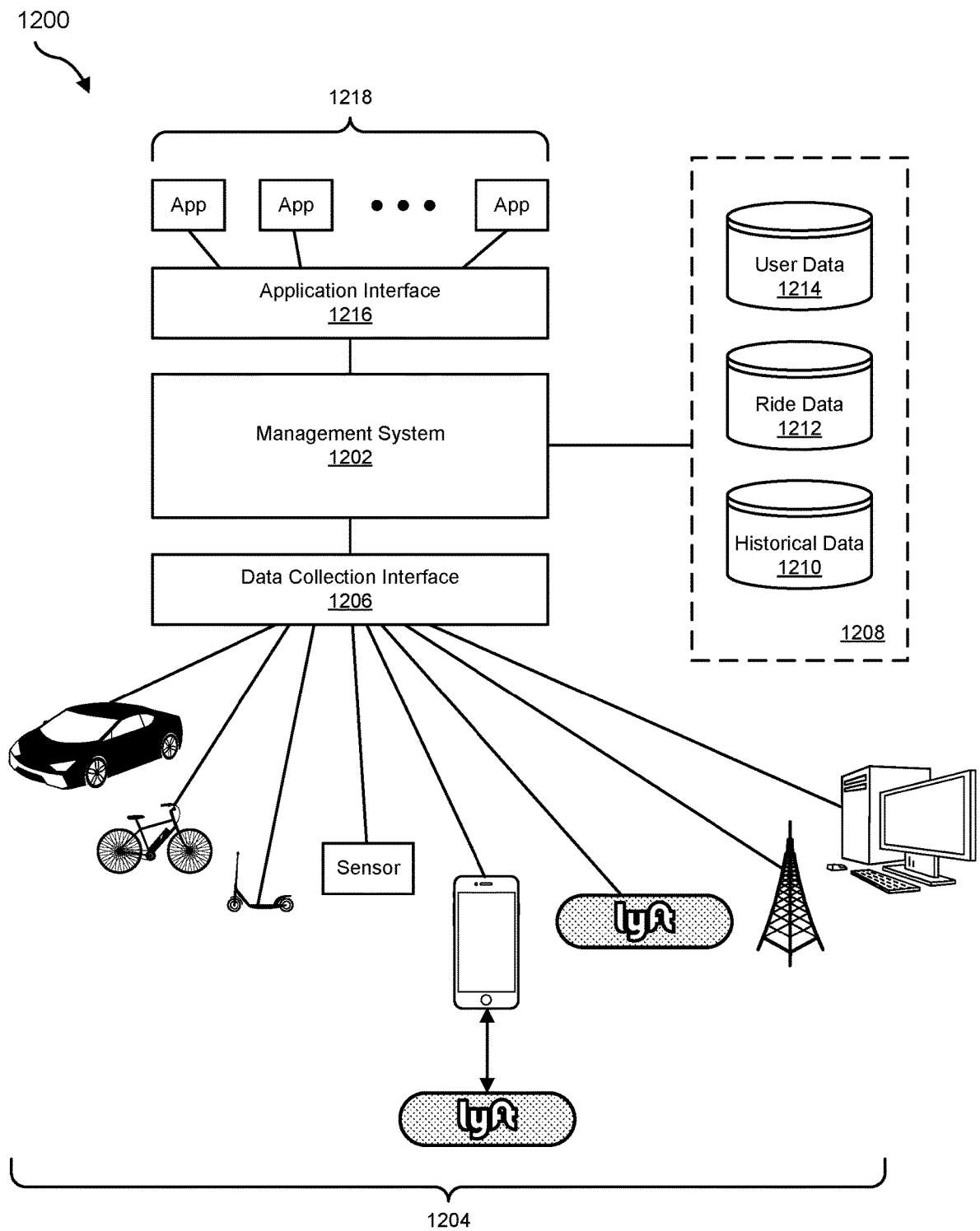
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
executing, by at least one physical processor, a determination module that determines provider availability values for available transportation provider devices by determining a cumulative estimated time of arrival increase for the available transportation provider devices resulting from not matching each of the available transportation provider devices with any of one or more transportation requests for a current matching interval;

executing, by the at least one physical processor, a new session module that identifies that a dynamic transportation matching system session has been initiated on a new transportation requestor device;

executing, by the at least one physical processor, a caching module that caches the provider availability values; and executing, by the at least one physical processor, a matching module that:

tentatively matches the new transportation requestor device with a transportation provider device identified based at least in part on the cached provider availability values, and matches the new transportation requestor device with the identified transportation provider device in response to receiving a transportation request from the new transportation requestor device within the current matching interval.

2. The computer-implemented method of claim 1, wherein the matching module identifies the transportation provider device based at least in part on the cached provider availability values indicating that matching the transportation provider device with a transportation request from the new transportation requestor device will have a low estimated time of arrival (ETA) impact on the available transportation provider devices.

3. The computer-implemented method of claim 1, wherein the new session module identifies that the dynamic transportation matching system session has been initiated on the new transportation requestor device by identifying that the new transportation requestor device has opened a dynamic transportation matching system application on the new transportation requestor device.

4. The computer-implemented method of claim 1, wherein the new session module identifies that the dynamic transportation matching system session has been initiated on the new transportation requestor device by identifying that destination information has been entered into a dynamic transportation matching system application on the new transportation requestor device.

5. The computer-implemented method of claim 1, wherein determining the cumulative estimated time of arrival increase for the available transportation provider devices resulting from not matching each of the available transportation provider devices with any of one or more transportation requests for the current matching interval comprises solving a linear programming problem.

6. The computer-implemented method of claim 1, wherein the determination module determines provider availability values at regular intervals.

7. The computer-implemented method of claim 1, wherein:

the new session module identifies that a dynamic transportation matching system session has been initiated on an additional transportation requestor device;

the matching module tentatively matches the additional transportation requestor device with an additional transportation provider device identified based at least in part on the cached provider availability values; and the matching module releases the tentative match between the additional transportation requestor device and the additional transportation provider device after a predetermined interval of time elapses without receiving a transportation request from the additional transportation requestor device.

8. The computer-implemented method of claim 7, wherein the determination module, in response to the matching module releasing the tentative match between the additional transportation requestor device and the additional transportation provider device, re-evaluates a current state of received transportation requests and available transportation provider devices by determining new provider availability values for the available transportation provider devices.

9. A system comprising:

a determination module, stored in memory, that determines provider availability values for available transportation provider devices by determining a cumulative estimated time of arrival increase for the available transportation provider devices resulting from not matching each of the available transportation provider devices with any of one or more transportation requests for a current matching interval;

a new session module, stored in the memory, that identifies that a dynamic transportation matching system session has been initiated on a new transportation requestor device;

a caching module, stored in the memory, that caches the provider availability values;

a matching module, stored in the memory, that:

tentatively matches the new transportation requestor device with a transportation provider device identified based at least in part on the cached provider availability values, and matches the new transportation requestor device with the identified transportation provider device in response to receiving a transportation request from the new transportation requestor device within the current matching interval; and at least one physical processor that executes the determination module, the new session module, the caching module, and the matching module.

10. The system of claim 9, wherein the matching module identifies the transportation provider device based at least in part on the cached provider availability values indicating that matching the transportation provider device with a transportation request from the new transportation requestor device will have a low ETA impact on the available transportation provider devices.

11. The system of claim 9, wherein the new session module identifies that the dynamic transportation matching system session has been initiated on the new transportation requestor device by identifying that the new transportation requestor device has opened a dynamic transportation matching system application on the new transportation requestor device.

12. The system of claim 9, wherein the new session module identifies that the dynamic transportation matching system session has been initiated on the new transportation requestor device by identifying that destination information has been entered into a dynamic transportation matching system application on the new transportation requestor device.

13. The system of claim 9, wherein determining the cumulative estimated time of arrival increase for the available transportation provider devices resulting from not matching each of the available transportation provider devices with any of one or more transportation requests for the current matching interval comprises solving a linear programming problem.

14. The system of claim 9, wherein the determination module determines provider availability values at regular intervals.

15. The system of claim 9, wherein:
the new session module identifies that a dynamic transportation matching system session has been initiated on an additional transportation requestor device;
the matching module tentatively matches the additional transportation requestor device with an additional transportation provider device identified based at least in part on the cached provider availability values; and
the matching module releases the tentative match between the additional transportation requestor device and the additional transportation provider device after a predetermined interval of time elapses without receiving a transportation request from the additional transportation requestor device.

16. The system of claim 15, wherein the determination module, in response to the matching module releasing the tentative match between the additional transportation requestor device and the additional transportation provider device, re-evaluates a current state of received transportation requests and available transportation provider devices by determining new provider availability values for the available transportation provider devices.

17. A non-transitory computer-readable medium comprising computer-readable instructions that, when executed by at least one processor of a computing device, cause the computing device to:
determine provider availability values for available transportation provider devices by determining a cumulative estimated time of arrival increase for the available transportation provider devices resulting from not matching each of the available transportation provider devices with any of one or more transportation requests for a current matching interval;
identify that a dynamic transportation matching system session has been initiated on a new transportation requestor device;
caching the provider availability values;
tentatively match the new transportation requestor device with a transportation provider device identified based at least in part on the cached provider availability values; and
match the new transportation requestor device with the identified transportation provider device in response to receiving a transportation request from the new transportation requestor device within the current matching interval.

18. The non-transitory computer-readable medium of claim 17, further comprising computer-readable instructions that, when executed by the at least one processor of the computing device, cause the computing device to identify the transportation provider device based at least in part on the cached provider availability values indicating that matching the transportation provider device with a transportation request from the new transportation requestor device will have a low estimated time of arrival (ETA) impact on the available transportation provider devices.

19. The non-transitory computer-readable medium of claim 17, further comprising computer-readable instructions that, when executed by the at least one processor of the computing device, cause the computing device to identify that the dynamic transportation matching system session has been initiated on the new transportation requestor device by identifying that the new transportation requestor device has opened a dynamic transportation matching system application on the new transportation requestor device.

20. The non-transitory computer-readable medium of claim 17, further comprising computer-readable instructions that, when executed by the at least one processor of the computing device, cause the computing device to identify that the dynamic transportation matching system session has been initiated on the new transportation requestor device by identifying that destination information has been entered into a dynamic transportation matching system application on the new transportation requestor device.

* * * * *